United States Patent Office 3,086,887
Patented Apr. 23, 1963

3,086,887
TEXTILE SIZING
Emile E. Habib, Spartanburg, S.C., assignor to Deering Milliken Research Corporation, Spartanburg, S.C., a corporation of Delaware
No Drawing. Filed Apr. 14, 1961, Ser. No. 102,922
11 Claims. (Cl. 117—139.5)

This invention relates to novel compositions useful as textile sizes and to processes for their production, their uses as sizes and to textile fabrics thus sized. More particularly it relates to inert starch based sizes containing a water-soluble, film-forming thermoplastic polyethyleneoxy polyurethane.

Starches constitute by far the major class of adhesives or binders used in sizing compositions. Their use is primarily directed to sizing of cotton warps or warps containing a mixture of fibers or yarns comprising cotton. Starches alone, however, do not have the properties which would enable them to be used in modern sizing and weaving machinery. Therefore, sizing compositions employing starch as the adhesive or binder also employ substantial amounts of softeners, lubricants, deliquescents, and penetrants. Softeners are used to reduce the stiffness and brittleness of the starch film, give a better hand and make the size film more pliable, and to permit proper separation of the warp yarns at the lease rods during the slashing operation. However, softeners weaken the size film and decrease the friction between the fibers of spun yarns, thereby decreasing breaking strength and increasing the frequency of broken warp ends during weaving. Lubricants are employed to reduce friction between the yarn and moving surfaces which contact each other during the weaving operations. These also tend to produce a weaker, discontinuous brittle size film. Also, conventional softeners and lubricants, being ordinarily hydrophobic materials, tend to interfere with the hydration of the starch film. They produce greasy shedding which makes loom cleaning difficult. As a starch film is considerably stronger at very high humidities, deliquescent materials are employed in order to promote the desired moisture content in the sized material. However, it is a recognized fact, when employing a starch size modified with any of the known deliquescent materials, that weave room humidities are nevertheless required which are too high for employee comfort and maximum equipment life. Moreover, a starch base sizing composition as described above has less than optimum properties as each of the modifiers for starch contribute an undesirable property to the size and the sized material. The net result is that the ingredients employed to make a starch an operable sizing material produce a starch based sizing composition which is less than completely satisfactory in all respects.

It is therefore an object of this invention to provide novel inert starched based sizing compositions.

It is another object to provide novel inert starch based sizing compositions having improved properties and less of the undesirable properties of the starch based sizing compositions of the prior art.

Another object is to provide a process for producing novel sized fabrics.

Still another object is to provide novel sized fabrics.

Other objects will be apparent to those skilled in the art to which this invention pertains.

According to this invention, there is provided novel starch based sizing compositions consisting essentially of an inert starch and a water-soluble, film-forming thermoplastic polyethyleneoxy polyurethane which provides one or more of the properties obtained when using the softeners, lubricants and deliquescent agents of known starch based sizing compositions and without contributing the undesirable properties which accompanies the use of these agents; aqueous sizing baths comprising such compositions; novel methods of sizing employing such compositions; and textile materials sized with such compositions.

The novel starch and polyurethane based sizing compositions of this invention are characterized by their outstanding character and performance as sizing materials. Warps sized with these novel compositions are strong, flexible, abrasion resistant, self-softening, self-lubricating and self-humidifying, thus eliminating the necessity of any softeners, lubricants or humectants in the sizing mixture, which results in improved weaving efficiency, cleaner and more readily cleaned loom machinery, more readily scoured or desized fabric, and the preparation of better quality warps and fabrics. As textile yarns and warps sized with these novel sizing compositions are self-humidifying to a controlled degree, weave room humidities can be lowered or adjusted to a selected level, e.g., for personnel comfort and efficiency and reducing corrosion and accelerated wear of equipment, without adversely affecting the properties of the sized material.

The term "inert starch" when used herein means any of the natural, i.e., chemically unmodified, starches employed in regular sizing compositions, e.g., corn, potato, tapioca, sago, wheat, rice and sweet potato starches, which are ordinarily preferred, and the carbohydrate derivatives of the starches which are substantially inert, to cellulose and the polyurethane, e.g., hydrolyzed starch, chlorinated starch and starch esters such as, for example, starch phosphate, and starch ethers, e.g., starch methyl ether. The term "inert starch" excludes, however, the reactive starch derivatives such as starch dialdehyde which is chemically reactive to cellulose and/or the polyurethane, and which is not, in fact, even a carbohydrate.

The term "water soluble" means soluble in the same manner as starch in at least hot water. As the selected polyurethane must be compatible with the selected starch in the size box solution, the selected polyurethane must be soluble, at 50° C. or higher, in an aqueous starch dispersion.

The term "film forming thermoplastic" means that the selected polyurethane can be cast into a film which melts above room temperature, usually above 35° C., and preferably above 45° C. but is thermoplastic, i.e., melts below about 150° C., and preferably below about 100° C. Preferred are those polyurethanes having film extensibility of greater than 5%, more preferably 10% to 25% or more, and a breaking tensile strength, as a 0.005 inch film, of at least 100 lbs. per square inch, preferably 1,000 lbs. or more. Some of these films have the ability to be cold drawn, i.e., a dry, cast film can be oriented into a much stronger film by drawing the film from 50% to 300% or more which greatly increases its elasticity and strength. Some of the polyurethanes described hereinafter have strengths approaching nylon. These polyurethanes usually have viscosities, as a 25% aqueous solution, at 25° C., of from about 1,000 centipoises (cps.) to 2,000 to 10,000 cps. or higher. Those having a viscosity of at least about 10,000 cps. are preferred.

The term "polyethyleneoxy polyurethane" means a polyurethane as defined herein containing, in addition to the urethane groups, ethyleneoxy polymeric units, e.g., of the formula ($-O-C_2H_4-$)$_m$ (I) wherein $m$ is an integer of from about 15 to 10,000 or higher. These polyurethanes can be prepared by the reaction of a diisocyanate, e.g., of the formula $OCN-R-NCO$ (II) wherein R is a non-reactive divalent aliphatic or aromatic connecting radical, preferably hydrocarbon, e.g., containing less than about 15 carbon atoms, preferably 2 to 12, as exemplified by arylene, e.g., phenylene, tolylene, thiophenylene, p-diphenylene, naphthylene, p,p′-diphenylenemethane lower-alkylene, e.g., trimethylene, tetramethylene and hexamethylene, with a water-soluble polyalkyleneoxy glycol, preferably of the formula

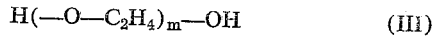

wherein $m$ has the value given above, but is preferably from about 45 to 225, more preferably 100 to 160. Compounds represented by (III) are the well-known polyethylene ether glycols. Other polyalkyeneoxy glycols are the known block polymers comprising polyethyleneoxy polymeric units in an amount sufficient to produce water solubility in the resultant polyalkyleneoxy glycol. The preparation of these polyurethanes is described more fully hereinafter.

These polyurethanes are characterized by their compatibility, in the proportions employed, with starches in aqueous solutions. Most form a homogeneous dispersion therewith, in the proportions employed, in the cold as well as hot in the size box. Their film-forming characteristics and their compatibility with starch retain the film strength of the starch on the sized yarns and contribute greatly to the adhesive strength thereof. Their thermoplasticity provides a markedly superior means of separating the individual yarns of the sized warp by passing the sized and dried warp through the lease rods while hot. In doing so, the molten polyurethane permits a separation of the yarns without substantial fuzz formation, i.e., raising of the fibers of the yarn, thereby increasing yarn strength, reducing the incident of shedding during weaving and skin-backs to form lumps or balls which cause the yarn to break during weaving. In contradistinction, a dried cotton warp sized with starch alone could not be passed through the lease rods hot or cold without causing gross damage to or ruining the warp.

Yarns and warps, particularly those comprising or consisting of cotton, sized with the sizing composition of this invention are characterized by high size adhesion thereto, self-lubrication, a soft but firm hand, and good weavability at lower relative humidities than the same yarns and warps sized with known starch-based sizing compositions.

Water-soluble, film-forming polyurethanes are a known class of compounds. See, e.g., U.S. Patent 2,948,691 and the applications of Kuemmerer, S.N. 808,297, filed April 23, 1959, now Patent No. 3,061,470, and Bolinger and Habib, S.N. 43,297, filed July 18, 1960. They are characterized in general by their ability when dry to be cold drawn into fibrous, crystalline films or filaments. They are hygroscopic at high relative humidities and, depending upon their molecular weight, soluble in either cold or hot water.

The preparation of preferred types of starting polyurethanes is described below.

(a) *Polyethyleneoxy glycol polyurethanes.*—The water-soluble polyethyleneoxy polyurethanes employed in the compositions of this invention are prepared by reacting a substantially anhydrous, water-soluble polyethyleneoxy glycol, e.g., of Formula III, with at least about 1, e.g., 0.9 to 1.2, molar equivalent of diisocyanate, preferably an aryl diisocyanate. Less than 2.0 and ordinarily less than 1.5 molar equivalents of diisocyanate is used. If other isocyanate reactive groups are present in the reaction mixture, e.g., hydroxy groups, additional diisocyanate must be added if the above molar proportions are to be maintained.

The term "substantially anhydrous polyethyleneoxy glycol" is used to define a glycol containing less than about 0.5%, preferably less than 0.1%, free water, i.e., containing only a trace of free moisture. It has been found that some commercial polyethyleneoxy glycols containing more than 0.5% free water sometimes react to produce polymers of lower strength, making them less suitable to use in the compositions of this invention. This can be avoided by increasing the molar ratio of diisocyanate to compensate for the water present. However, it is preferred to employ substantially anhydrous glycols as defined above.

"Free water" means water that can readily be removed, e.g., by heating under vacuum for several hours or azeotropically distilling benzene or toluene from a solution with the glycol. After such water removal, there often remains water which can be detected by the Karl Fischer test, but such water apparently is molecularly bound with the glycol and does not adversely affect the polymerization reaction.

Although the starting polyethyleneoxy glycol and reaction mixture should be substantially anhydrous, the latter preferably is not completely anhydrous as the reaction, to proceed in a desirable fashion, sometimes requires the presence of a trace of moisture, e.g., 10–500 parts per million on the polyethyleneoxy glycol, to initiate and promote the reaction, particularly if the molar ratio of diisocyanate to glycol is in excess of 1:1. If the polymer solution is anhydrous, water can be added in the range of about 100 to 200 parts per million when the molar ratio of diisocyanate to glycol is in excess of 1:1. At about 1:1 ratio, water preferably is not added.

A wide variety of diisocyanates can be used to prepare the polyurethanes employed in the compositions of this invention, but aryl, especially monophenyl diisocyanates are preferred. Suitable compounds include tolylene-2,4-diisocyanates, tolylene-2,6-diisocyanate, m-phenylene diisocyanate, 2,2'-dinitrodiphenylene-4,4'-diisocyanate, cyclohexylphenylene-4,4'-diisocyanate, hexamethylene diisocyanate, diphenylene-4,4'-diisocyanate, diphenylmethane-4,4'-diisocyanate, di-para-xylylmethane-4,4'-diisocyanate, naphthylene-1,4-diisocyanate and the corresponding 1,5 and 2,7-isomers thereof, fluorene-2,7-diisocyanate, chlorophenylene-2,4-diisocyanate and dicyclohexylmethane-4,4'-diisocyanate.

Any catalyst known to be useful in the reaction of polyalkyleneoxy glycols with diisocyanate may be used in the present invention including the tertiary organic bases of U.S. Patent 2,692,874, e.g., triethylamine, pyridine, their acid salts, tri-n-butylphosphine and the like and inorganic bases, e.g., sodium hydroxide, potassium hydroxide, sodamide and sodium carbonate. Good results are obtained by using organo-metallic salts, e.g., cobalt naphthenate and similar salts of lead, zinc, tin, copper and manganese. The organic radicals may be either aliphatic or aromatic residues. Ordinarily, only a very small amount of the organo-metallic catalyst is required, e.g., from about 0.1 to 0.001% of the reactants. With such organo-metallic catalysts, the catalyst can be destroyed, e.g., with oxygen, hydrogen sulfide, etc., after the reaction is complete to ensure that adverse catalyzed reactions do not subsequently occur.

Although the polymerization reaction can be conducted in the absence of a solvent, i.e., as a melt, it is ordinarily preferred to conduct the reaction in an inert solvent to avoid working with too viscous mixtures. Generally speaking, it is preferred to operate with reaction mixtures having a viscosity of less than 1,000,000 cps. It is possible to reach this viscosity, when operating without a solvent, before a reaction product is obtained which has optimum sizing properties. Thus, it is ordinarily desirable to employ a reaction solvent. Toluene is preferred. From a mechanical point, it is advantageous to keep the reaction mass at a viscosity below about 800,000 cps. However, if two much of an inert solvent is employed, it tends to interfere with the reaction and slow it down. This effect can, to a certain extent, be overcome by the use of a stronger or larger amount of catalyst. It is ordinarily desirable to employ only that amount of solvent which will impart a viscosity to the reaction mixture in the range of about 100,000 to 1,000,000 cps. preferably around 300,000 to 800,000 cps. The amount of solvent employed can be varied considerably, e.g., from about 10% to 90% of the total reaction mixture.

The temperature of the polymerization reaction can be varied over a considerable range so long as the reaction is stopped at the desired point. The reaction proceeds slowly unless the temperature is above about 65° C. However, the temperature should not exceed 150° C., and preferably should not exceed 110° C. The preferred range is from about 70° C. to 90° C. The reaction time is a function of such factors as temperature, mixing speed, ratio of the reactants, water concentration and amount of catalyst and solvent employed.

Oxidation and discoloration of the reaction product can be avoided by conducting the polymerization reaction in an inert atmosphere, e.g., nitrogen, which also aids in the production of a more uniform reaction product.

When the desired viscosity is reached, the resulting polymer can, if desired or necessary to avoid further polymerization, be chain terminated in the manner described hereinafter to terminate the polymerization reaction, or epoxide modified as described below and then chain terminated.

(b) *Epoxide modified polyethyleneoxy glycol diisocyanate polyurethanes.*—The epoxide modified polyethyleneoxy glycol diisocyanate polyurethanes are prepared by the reaction of a polyethyleneoxy glycol diisocyanate polyurethane described above with an epoxide before the polymerization reaction is terminated. This reaction can proceed concommitantly with the primary polymer production, i.e., as soon as some of the above-described polymer has been produced, it can be reacted with the epoxide. Thus, although the epoxide can be added at almost any point during the primary polymer reaction, the only requirement is that at least the terminal portion of the polymer production is conducted in the presence of the epoxide. The preferred procedure involves adding the epoxide to the reaction mixture for a few minutes, e.g. 1 to 15 minutes, before the polymer is chain terminated.

Examples of epoxides, preferably the compounds which can be prepared from α-glycols, are the lower hydrocarbon, i.e., containing from 2 to 12 carbon atoms, epoxides including styrene oxide, α-phenylpropylene oxide, trimethylene oxide and the other lower-alkylene oxides, i.e., epoxides containing from 2 to 8, preferably 2 to 4, carbon atoms, inclusive, e.g., ethylene oxide, propylene oxide, butylene oxide, isobutylene oxide. The epoxides preferably are monofunctional, i.e., contain no other groups reactive to the polymer.

The amount of epoxide which can be added to the polyethyleneoxy glycol diisocyanate polyurethane can be varied over a wide range, i.e., from about 0.1 mole per mole of diisocyanate to the theoretical 2 moles per mole of diisocyanate or more. Conveniently, and preferably if the epoxide is volatile, an excess of the epoxide can be added and the excess removed by distillation or evporation after the reaction has proceeded to the desired extent.

The epoxide modified portion of the polymerization reaction is ordinarily conducted in substantially the same manner as the preceding portion of the polymerization reaction. However, when a particularly volatile epoxide is employed, e.g., ethylene oxide, it may sometimes be necessary to lower the reaction temperature or employ pressure equipment to prevent excessive loss of the epoxide.

As stated above, the point at which the reaction should be modified by the addition of an epoxide so as to produce a polymer which is still water soluble is not particularly critical, so long as the epoxide is added before the polymer reaches maximum permissible viscosity. Visual inspection of the reaction mass, i.e., its viscosity, reaction to stirring, stringiness, etc., provides a good guide, and with any given reactants, empirical viscosity determinations may be used.

These epoxide modified starting polymers can then be chain terminated, if desired, in the manner described below.

(c) *Chain termination of the polyethyleneoxy glycol diisocyanate polyurethanes.*—The chain termination of a polymer is a well-known reaction in polymer chemistry. In this step, any terminal reactive groups of the polymer are reacted with a nonchain extending compound which inactivates these groups. In the instant polymer, any reactive terminal groups would be isocyanate groups. These groups are inactivated by reaction with a nonchain extending compound having an active hydrogen, i.e., those hydrogen atoms which display activity according to the well-known Zerewitinoff test. See J. Am. Chem. Soc., 49, 3181 (1927). For a discussion of diisocyanate chemistry, see National Aniline Division of Allied Chemical and Dye Corporation Technical Bulletin 1–17 and the references cited therein. Chain terminating agents include the alcohols, water, secondary amines, acids, inorganic salts having an active hydrogen, mercaptans, amides, alkanol amines, oximes, etc., preferably the saturated aliphatic mono-alcohols. Lower-alkanols, e.g., containing up to four carbon atoms, methanol, ethanol, isopropanol and butanol, are preferred. However, because the aldehyde modification reaction described below is most conveniently conducted as an aqueous solution, the polymerization reaction can be terminated by adding water to produce the desired solids concentration and then distilling any organic solvent present in the mixture.

The minimum amount of chain terminating agent which should be employed will vary according to the ratio of diisocyanate to hydroxy groups present in the reaction mixture and the extent to which the polymerization reaction has proceeded. While a theoretical minimum may be readily calculated, e.g., 0.01–1 molar equivalents, it is preferred to add at least several molar equivalents, calculated on the diisocyanate used, as a safe excess. Obviously, if the amount of diisocyanate employed is such that no isocyanate groups remain when the polymerization has proceeded to the desired degree, no chain termination is required.

(d) *Aldehyde modified polyethyleneoxy glycol diisocyanate polyurethanes.*—A water-soluble, preferably chain terminated, polyurethane described above, usually as an aqueous solution, can be reacted with an aldehyde to produce a polymer having improved properties, including increased film strength and greater resistance to degradation by heat, which is an important property as they are subjected to prolonged periods of heating during slashing when used in the size compositions of this invention.

A wide variety of aldehydes can be employed, both aromatic and aliphatic. The aldehyde can be monoaldehydic or polyaldehydic. It is preferred if the aldehyde has no groups other than aldehydic which can be reacted with the starting polymer. Examples of aldehydes, e.g., aliphatic preferably containing one to twelve carbon atoms, include formaldehyde, acetaldehyde, propionaldehyde, butyraldehyde, nonaldehyde, formylcyclohexane, and other lower-aliphatic and alicyclic monofunctional aldehydes, glyoxal, pyruvaldehyde, ethylglyoxal, amylglyoxal, and other α-carbonyl-lower-aliphatic aldehydes, benzaldehyde, cinnamaldehyde, phenylacetaldehyde, α-naphthaldehyde, pyrocatechualdehyde, veratraldehyde, α-formylthiophene, α-formylfuran, and other substituted and unsubstituted aliphatic and aromatic aldehydes.

The reaction of the starting polyurethane with the selected aldehyde can be conducted at any convenient temperature, e.g., 0° to 100° C., although a temperature between about 20° C. and 85° C. is more desirable and between about room temperature and about 70° C. preferred. If it is desired to have the reaction reach completion very rapidly, a temperature of about 70° C. should be employed. Conversely, if it is feared that the reaction may proceed too rapidly toward an insoluble product, e.g., when operating at a pH from about 3 to 5 with relatively large amounts of aldehyde, then room temperature or lower should ordinarily be employed.

The reaction can be conducted at any pH between about 3 and about 10. Outside this range, the starting and result polymer tend to be unstable. Ordinarily, it is preferred to stay within the range of about 3.5 to about 9. If it is intended to produce an acid size, e.g., one particularly useful on wool or nylon, the reaction can be conveniently conducted at a pH of between about 3 and 7, preferably between about 3.5 and 6. For Dacron, Orlon, viscose, acetate, triacetate, cotton and other yarns, the reaction can be conducted at a pH of between about 7 and 10, preferably between about 7.5 and 9.

The amount of aldehyde which can be added to the starting polymer without producing or proceeding too rapidly toward a water-insoluble reaction product is closely related to the pH of the reaction mixture. On the alkaline side, much more of the aldehyde can be added with safety than on the acid side. In fact, at an alkaline pH it is sometimes preferred to have excess unreacted aldehyde in the size mixture as the resulting size appears to be more stable to heat. It will be apparent from the above that, when operating at an alkaline pH, care should be taken that the pH does not drift during the reaction to the acid side. This can be avoided by conducting the reaction in the absence of oxygen to prevent the air oxidation of the aldehyde or by buffering the solution, e.g., with $Na_2HPO_4$. Also, when operating on the acid side, if the reaction product is approaching water insolubility, the pH of the reaction mixture can be adjusted upward, e.g., with an organic or inorganic base, e.g., ethyl amine, sodium hydroxide or ammonia, to render the reaction product less reactive toward the residual aldehyde.

Generally, it is preferred to employ less than 0.1% and more preferably less than 0.05%, of formaldehyde, calculated on the polymer solids, when the reaction is conducted at a pH of less than 7, whereas less than 10% and preferably less than 5% is ordinarily employed at a pH of about 7 or greater. In any case, the reaction is conducted for a time less than that required to produce a water-insoluble reaction product. The preferred starting reaction mixture is preferably aqueous, e.g., with 20–30% polymer solids. These mixtures can have a viscosity from about 2,000 to as high as 50,000 cps. or higher at 25% solids at 25° C. With a highly reactive aldehyde, e.g., formaldehyde, on the acid side at, e.g., 90° C., the desired reaction will occur in a matter of minutes. At room temperature, the viscosity can slowly rise for several weeks or more on the acid side employing less than 0.1% of the aldehyde or when employing a slowly reacting aldehyde such as dialdehyde starch. On the alkaline side, any viscosity change usually is less rapid.

The stability of the above-described polyurethanes as aqueous solutions is excellent so that they may be stored in any of their liquid or solids forms and their good water solubility permits ready mixing with the selected starch.

Yarns which can be sized with the starch and polyurethane sizing compositions of this invention include all those that presently are sized with the known starch based sizing compositions, e.g., cotton and cotton blends, e.g., cotton and Dacron polyester, cotton and acetate or triacetate, cotton and viscose, cotton and wool, and cotton and nylon. Other yarns include wool, spun viscose, and blends of these with other fibers. Because of the greater adhesion of the novel sizing compositions, they can be used in sizing yarns and warps not suitably sized with the conventional starch based sizes.

Warps of the above yarns, sized with these starch and polyurethane sizing compositions, are characterized by a soft, pleasing hand, resistance to abrading and dusting, freedom from tackiness and the ability to be woven at relative humidities lower than commonly employed with starch sized warps. They do not possess the greasy feel of heavily lubricated and softened warps. The sizing box is more readily maintained in a homogeneous state and mixing of the polyurethane with the cooked starch is easier than with conventional additives and modifiers. Desizing is facilitated with better and more complete size removal being possible due to the hydrophilic properties of the polyurethane.

The sizing operation can be conducted in general according to the usual sizing procedures employed with starch based sizes. The selected starch can be cooked and an aqueous solution of the selected polyurethane added to cooked starch solution in an amount to provide the desired weight ratio. The amounts of sizing solids which should be applied to the selected yarn will generally be somewhat less than when employing conventional starch based sizing compositions. Amounts as low as 5% to as high as 25%, calculated on the unsized dry yarn can be employed with the usual range being from about 10% to 15%. The sizing solution will generally contain about the same range of percentages of solids, i.e., about 5% to 25%, preferably about 10% to 20%, depending on the wet pick-up and the amount of size to be retained on the warp.

The ratio of starch to polyurethane will depend upon the selected starch and the selected polyurethane and its hygroscopic, softening and lubricating properties. A ratio of from about 50 to 1 to about 10 to 1, solids basis, is usually employed, the higher ratio being employed when weaving is conducted at 75% or higher relative humidities and the lower ratio at low, e.g. 55% to 65%, relative humidities. When weaving at about 70% to 85% relative humidities a ratio of from about 15 to 1 to about 35 to 1 is preferred.

The sized warp preferably should be passed through the lease rods while warm or hot, i.e., above the melting point of the polyurethane, to take advantage of the novel thermoplastic characteristics of the sizing composition provided by the presence of the polyurethane, which facilitates the separation without unduly roughening the surface of the yarn and breaking up the starch film. This can be accomplished by heating the last dry can.

While the use of water-soluble, film-forming polyurethanes with starch as a complete sizing mixture to provide self-softening, lubricating and humidifying properties does not preclude the use of small amounts of additional softeners, lubricants and humectants, e.g., those used in conventional starch based sizing compositions, it will be apparent that this invention is directed to eliminating these materials and their undesirable properties from the novel sizing compositions. Their use, if at all, should therefore be in the order of less than 3 to 5% of the total solids and preferably less than about 1%. The term "consisting essentially of" as used herein thus means that ordinarily the sizing mixture does not contain more than about 3% additional solids, and preferably less than this amount of hydrophobic materials, e.g., silicones, fats, waxes, oils, etc., although in some instances as high as 5% additional solids is permissible if they are not predominantly hydrophobic materials.

The following preparations and examples are illustrative of the process and products of this invention, but are not to be construed as limiting.

PREPARATION I

Heat under nitrogen wtih rapid stirring 3,750 grams of polyethylene ether glycol having an average molecular weight of about 6000 in a 12 liter 3 neck round bottom flask at 70 to 80° C. Dry by adding 250 ml. toluene and then stripping the solvent at reduced pressure. Add 4.4 grams of a solution of 6% cobalt naphthenate in dry xylene to 1250 ml. dry toluene and then add the resulting solution slowly to the melt at 75–80° C. with stirring. Add 131 grams of tolylene-2,4-diisocyanate over a ten minute period and stirred ten minutes. There should be a 2 to 5° temperature rise at this stage. Next, slowly add dropwise about 10 to 20 drops (0.4 to 0.8 gram) of water. Continue stirring at 80–95° C. for 15 minutes and then reduce the stirring speed. When the viscosity reaches about 200,000 cps. at about 85° C. (90 to 120 minutes), slowly add 1250 ml. of dry toluene (90 to 120 minutes) without lowering the temperature below 80° C. or markedly reducing the viscosity. After the toluene addition has been completed and the viscosity reaches about 300,000 cps., equip the flask with a reflux condenser and then slowly add 104 grams of propylene oxide. After about ten minutes, remove the excess propylene oxide by distilling at reduced pressure. When the viscosity reaches 500,000 cps. (usually 15 to 45 minutes) terminate the reaction by stirring in 100 grams of absolute ethanol. Stir in 5 liters of hot water and stop the heating. Transfer the reaction mixture to a 20 liter flask, add 7.5 liters of water and distill off the toluene at reduced pressure. There is obtained a clear, amber solution of about 25% solids having a viscosity of about 10,000 to 25,000 cps. at 25° C.

An equimolar amount of polyethylene ether glycol having a molecular weight of about 4,000 or 10,000 can be substituted for the PEG 6000.

Similarly, if the selected molar ratio of diisocyanate to glycol is about 1:1, the water can be eliminated. This reaction can be continued to much higher viscosities without danger of insolubilization. The resulting polymer need not be chain terminated.

PREPARATION II

Follow the procedure of Preparation I exactly except eliminate the propylene oxide step. A 25% aqueous solution of the polymer has a viscosity of about 6,000 cps. or higher.

The procedures of Preparations I and II can be followed exactly except that the reactions can be terminated with 100 g. of n-butanol, methanol or isopropanol instead of ethanol. Similarly, 120 g. of tolylene-2,4-diisocyanate and 3.3 g. of the 6% cobalt naphthenate solution can be employed. An equimolar amount of polyethylene ether glycol having an average molecular weight of 4,000 or 10,000 and 200 g. of tolylene-2,4-diisocyanate or 187 g. of diphenylmethane-4,4'-diisocyanate can also be employed. Equimolar amounts of hexamethylene diisocyanate or p,p'-diphenylene diisocyanate can also be substituted for the tolylene-2,4-diisocyanate.

PREPARATION III

Prepare a 25% aqueous solution of the polyurethane produced according to Preparation I. Adjust the pH to 8.2 with 1 N sodium hydroxide. Under a blanket of nitrogen and with stirring, add sufficient 10% formalin to give 1.25% formaldehyde, calculated on the polymer solids. Heat the mixture to 70° C. for 30 minutes and then destroy any unreacted formaldehyde by adding sufficient 10% aqueous ammonia to bring the pH to about 8.5 to 9.0. Stir for another 20 minutes. The polyurethane remains water soluble for at least several weeks.

Similar results are obtained employing a starting polyurethane having about the same viscosity and prepared in the manner described in Preparation I employing a polyurethane ether glycol having a molecular weight of about 4,000 or 10,000.

The procedure of Preparation III can be followed except the reaction can be started at 60° C. and the mixture allowed to cool at room temperature, without adding ammonia to the resulting product.

PREPARATION IV

Follow the procedure of Preparation III except adjust the pH of the starting polymer solution to 8.5 with 1 N sodium hydroxide and add 2.25% of 10% aqueous formaldehyde, calculated on the starting polymer solids. Heat the mixture for ½ hour at 70° C. After standing for one week at room temperature, the pH of the solution can, if desired, be adjusted with ammonia to pH 9. 3.0% formaldehyde can be substituted for the 2.25% formaldehyde in the above-described reaction, and, if desired, the heating can be omitted and the product stored at room temperature for several days or weeks to react. The resulting solution will have a viscosity of at least 10,000 cps., usually 50,000 or more.

PREPARATION V

Adjust the pH to 4.0 of a 25% aqueous polyurethane solution having a viscosity of about 10,000 cps., at 25° C., prepared according to the procedure of Preparation I, with phosphoric acid. Add 0.03%, calculated on the polymer solids, of formaldehyde as a 1% aqueous solution. Maintain the mixture for 10–20 days at about 28° C. in the substantial absence of oxygen. The resulting mixture has a viscosity of about 130,000 to 180,000 cps. at 28° C. as a 25% aqueous solution.

In any of the above procedures, an equimolar amount of acetaldehyde can be substituted for the formaldehyde.

The procedure of Preparation V can be followed employing 1% benzaldehyde, calculated on the polymer solids, instead of the formaldehyde. If only 0.1% benzaldehyde is employed, the reaction can be conducted at 50° to 70° C. instead of at room temperature. Similarly, an equal molar amount of 30% aqueous glyoxal can be substituted for the formaldehyde. The reaction rate is somewhat slower than with formaldehyde.

The procedure of Preparation IV can be followed, adjusting the pH to 7.2 and substituting 3% of 30% aqueous glyoxal for the formaldehyde. The pH of the mixture will drop to about 5.5. The resulting mixture is stable without gelling for at least several days.

Any of the procedures of Preparations III to V can be followed employing as starting polymer one produced according to the procedure of Preparation II.

*Example I*

Prepare a starch sizing solution containing 100 pounds of tapioca starch by cooking in the usual manner. When proper solution is achieved, add thereto 5 pounds (solids) of a water-soluble polyurethane prepared according to the method of Preparation IV. Adjust the concentration so that a 15% solids pick-up is achieved with a 70 to 75% wet pick-up on a cotton warp. Follow the usual sizing procedure, passing the sized warp through the lease rods while the warp is hot. Permit a 5% moisture regain on the warp and weave a 109 x 64 plain weave at a relative humidity between about 70 and 75%.

For comparison purposes, prepare a conventional sizing solution under identical conditions but employ a sizing mixture consisting of 100 pounds tapioca starch, 6 pounds of the usual softener, i.e., hydrogenated glycerides, tallow, and emulsifying agent such as sulfonated wetting agent, and a humectant, e.g., gum tragacanth or locust bean gum, and 1.5 pounds of mill wax lubricant consisting of paraffin, tallow, glycerides, etc.

A comparison of the results obtained shows that with the warp sized only with the tapioca starch and polyurethane, there is reduced shedding on the loom and shuttle, increased sized yarn strength which results in reduced ends down and greater production efficiency, and the woven fabric is more readily and thoroughly desized.

*Example II*

Follow the procedure of Example I but reduce the amount of polyurethane in the sizing mixture to 3.1 pounds. Weave at about 70 to 75% relative humidity. Reducing the amount of polyurethane to 2.0 pounds provides a sized warp which can be woven at 75 to 80% relative humidity.

*Example III*

Follow the procedure of Example I but employ 7.5 pounds of the polyurethane. Weave at about 55–60% relative humidity.

*Example IV*

Follow the procedure of Example I, but substitute as the polyurethane a polyurethane prepared according to the procedure of Preparation I, II, III, or V.

Similarly, a warp consisting of a mixture of Dacron polyester and cotton can be substituted for the cotton warp and methyl ether sizing starch or any other starch employed for sizing can be substituted for the natural tapioca starch or any portion thereof.

What is claimed is:

1. An aqueous solution of a starch based sizing composition consisting essentially of an inert starch and a water-soluble, film-forming, thermoplastic polyethyleneoxy polyurethane in a starch to polymer ratio of about 35:1 to about 15:1, solids basis, the polyurethane having a melting point between about 35° and 150° C. and a viscosity, as a 25% aqueous solution at 25° C., of at least 2,000 cps.

2. A composition according to claim 1 wherein the polyethyleneoxy polymeric units of the polyurethane each contain at least 100 ethyleneoxy groups.

3. An aqueous solution of a starch based sizing composition consisting essentially of an inert starch and a water-soluble, film-forming, thermoplastic polyethyleneoxy polyurethane, said polyurethane melting between about 45° and 100° C., having a viscosity, as a 25% aqueous solution at 25° C., of at least 10,000 cps., and having polyethyleneoxy polymeric units each of which contain at least 100 ethyleneoxy groups, and wherein the ratio of starch to polyurethane is from about 35:1 to about 15:1, solids basis.

4. A composition according to claim 3 wherein the starch is a natural starch, the polyurethane is aldehyde modified and the polyethyleneoxy polymeric units thereof each contain between 100 and 160 ethyleneoxy groups.

5. A composition according to claim 4 wherein said polyurethane is formaldehyde modified.

6. A textile warp comprising cotton sized with 5% to 25% by weight of a size consisting essentially of an inert starch and a water-soluble, film-forming, thermoplastic polyethyleneoxy polyurethane, said polyurethane having a melting point between about 35° and 150° C., having a viscosity, as a 25% aqueous solution at 25° C., of at least 10,000 cps., and having polyethyleneoxy polymeric units each of which contain at least 100 ethyleneoxy groups, the ratio of said starch to said polyurethane being from about 35:1 to about 15:1, solids basis.

7. A warp according to claim 6 wherein said polyurethane has polyethyleneoxy polymeric units each of which contain from about 100 to 160 ethyleneoxy groups and is aldehyde modified.

8. A cotton warp sized with about 5% to 25% by weight of a size consisting essentially of a natural inert starch and a water-soluble, film-forming thermoplastic polyethyleneoxy polyurethane, said polyurethane having a melting point between about 45° and 100° C., having a viscosity, as a 25% aqueous solution at 25° C., of at least 10,000 cps. and having polyethyleneoxy polymeric units each of which contain between about 100 and 160 ethyleneoxy groups, and said polyurethane is formaldehyde modified, the ratio of said starch to said polyurethane being from about 35:1 to about 15:1, solids basis.

9. A method of sizing a warp comprising cotton which comprises the steps of passing said warp through an aqueous size bath containing between about 5% and 25% solids consisting essentially of an inert starch and a water-soluble, film-forming, thermoplastic polyethyleneoxy polyurethane, said polyurethane having a melting point between about 45° and 100° C., having a viscosity, as a 25% aqueous solution at 25° C., of at least 10,000 cps., and having polyethyleneoxy polymeric units each of which contain at least 100 ethyleneoxy groups, the ratio of said starch to said polyurethane being from about 35:1 to about 15:1, solids basis, drying the sized warp and passing the dried warp, at a temperature above the melting point of the polyurethane, through lease rods.

10. A method according to claim 9 wherein the polyethyleneoxy polymeric units of said polyurethane each contain from about 100 to 160 ethyleneoxy groups and said polyurethane is aldehyde modified.

11. A method according to claim 10 wherein said size bath contains from 10% to 20% solids and said polyurethane is formaldehyde modified.

References Cited in the file of this patent

UNITED STATES PATENTS

| | | |
|---|---|---|
| 2,948,691 | Windemuth et al. | Aug. 9, 1960 |
| 2,980,556 | McClelland | Apr. 18, 1961 |